United States Patent
Roeth et al.

(10) Patent No.: US 6,769,272 B2
(45) Date of Patent: Aug. 3, 2004

(54) METHOD AND APPARATUS FOR OXYGEN REFINEMENT OF A GLASS MELT

(75) Inventors: Gernot Roeth, Dalheim (DE); Thomas Pfeiffer, Ingelheim (DE); Klaus-Dieter Duch, Bingen (DE)

(73) Assignee: Schott Glas, Mainz (DE)

(*) Notice: Subject to any disclaimer, the term of this patent is extended or adjusted under 35 U.S.C. 154(b) by 106 days.

(21) Appl. No.: 09/793,041

(22) Filed: Feb. 26, 2001

(65) Prior Publication Data

US 2003/0196453 A1 Oct. 23, 2003

(30) Foreign Application Priority Data

Feb. 28, 2000 (DE) .......................................... 100 09 425

(51) Int. Cl.[7] .......................... C03B 5/187; C03B 5/225
(52) U.S. Cl. .................. 65/134.9; 65/29.12; 65/135.3; 65/160; 65/178; 65/374.12
(58) Field of Search ............................ 65/29.12, 29.16, 65/900, 134.4, 134.5, 134.6, 134.9, 135.3, 136.4, 139, 334.12

(56) References Cited

U.S. PATENT DOCUMENTS

| | | | |
|---|---|---|---|
| 2,331,052 A | * | 10/1943 | Shadduck ................. 65/134.4 |
| 3,233,993 A | * | 2/1966 | Eden ....................... 65/374.11 |
| 4,983,198 A | | 1/1991 | Ogino |
| 5,643,350 A | * | 7/1997 | Mason et al. ............... 65/158 |
| 5,785,726 A | | 7/1998 | Dorfeld |
| 5,849,058 A | * | 12/1998 | Takeshita et al. .......... 65/134.2 |
| 2002/0026811 A1 | * | 3/2002 | Hoyer et al. ............... 65/29.12 |

FOREIGN PATENT DOCUMENTS

| | | |
|---|---|---|
| DE | 30 22 091 C2 | 12/1982 |
| DE | 39 06 270 A1 | 9/1989 |
| JP | 2-48422 | 2/1990 |

OTHER PUBLICATIONS

Thomas Frey, et al.: "Entwicklung Einer Sonde Zur Messung Des ... ", Glastechn. Ber. 53 1980, NR. 5, pp. 116–123.

* cited by examiner

*Primary Examiner*—Steven P. Griffin
*Assistant Examiner*—Carlos Lopez
(74) *Attorney, Agent, or Firm*—Michael J. Striker

(57) ABSTRACT

An apparatus for making glass in which a glass melt is refined in a vessel with oxygen is described. It includes a melt-containing vessel (10) having a refining region (3) for refinement of the glass melt and a noble metal member for producing oxygen in the melt. The noble metal member (40) has an outer side facing the glass melt and an inner side facing away from the glass melt washed with and acted on with oxygen. Oxygen-containing bubbles are vigorously generated on the outer side of the noble metal member facing the glass melt when the inner side is washed with the oxygen.

11 Claims, 3 Drawing Sheets

METHOD AND APPARATUS FOR OXYGEN REFINEMENT OF A GLASS MELT

BACKGROUND OF THE INVENTION

1. Field of the Invention

The present invention relates to methods and processes for oxygen refinement of water and/or liquids containing hydroxyl groups, especially glass melts, to an apparatus for performing these methods and to glass obtained using these methods as part of the glass production process.

Liquids, in which gases are dissolved, which in part form bubbles in the liquid, participate in many technical production processes. Since these gases or gas bubbles interfere with further processing and/or disadvantageously impair the properties and thus the quality of the product, it is necessary to free the liquid of these bubbles. This process is called bubble removal or refinement.

In the following the problems of refinement of liquids are described using the example of refinement of a glass melt, but the invention should not be considered as limited to this example. The same problem is present in other applications.

2. Prior Art

During manufacture of glass from inorganic material raw materials and of course silica or glass sand, soda, limestone, marble or calcereous clay, are mixed and melted in a continuously running process. The melting process takes place in different stages, in which chemical reactions and physical processes occur side-by-side. At higher temperatures solid state reactions occur at the points of contact between neighboring grains. Moreover $CO_2$ and $H_2O$ are released from the crystalline phase. The $CO_2$ is generated by decomposition of the glass-forming salts. In so far as sulfates are present also $SO_2$ is released.

As a result of the decomposition of the starting materials present in the reaction mixture a considerable quantity of gas is generated during melting of glass. As a rough estimate, it is said that about 1 kg of glass results from melting 1.2 kg of the mixture, i.e. about ⅕ of the mixture weight is released in the form of gas during the melting. Furthermore also other gases are conducted through the mixture during the melting or introduced into the melting glass by the combustion oven.

The release of the gases, especially of $CO_2$, causes good pre-mixing of the glass melt. The gas generation and thus the pre-mixing are concluded at temperatures of about 800° C. to 1100° C.

The largest amount of gas escapes of course during the initial melting of the glass, but a considerable portion of the gas is captured by the melt. A portion of the captured gases is dissolved in the glass melt, but another portion remains as local gas inclusions, as so-called bubbles, in the glass melt. The bubbles shrink or grow when the bubble internal pressure is lower or higher than the equilibrium pressure of the dissolved gas. The gas bubbles have different sizes.

The resulting melt is thus designated a raw melt. However it has very distinct streaking or regions of varying index of refraction and many bubbles, which impair the quality of a glass and/or glass-ceramic body that is made from the glass melt. Because of this reason the still strongly streaked and bubble containing glass melt is heated further and homogenized by means of mechanical stirring elements, by chopping with fine needles or by blowing oxygen into it through fine nozzles. These methods refine the glass melt of the gas bubbles.

The term "refinement" or "refining" of the glass means a melting process comprising sequential melting process steps performed in so-called refining chambers, which removes gas bubbles of a predetermined size class; and guarantees a certain adjustment of the gas content of the glass melt and at the same time
is to be integrated in a complex sequence of melt processing steps.

The refinement of the glass is thus of the greatest significance for the quality of the end product of the melting process.

Different methods have been formulated for the refinement.

The gas bubbles have the tendency to rise in the melt due to their buoyancy and to escape into the atmosphere from the vessel containing the melt. Since this process however takes a considerable time without other influences, it would make a production process using it expensive because of its long dwell time for the refinement. It is thus known however to produce higher temperatures in the refining zone so that the viscosity of the melt and thus the bubble rising speed is increased and so that the bubble diameter also increases. These additional temperature increases however require considerable energy, which similarly greatly increases the process costs.

The chemical refinement of glass has been well tested and further optimized. Chemical refining agents and of course oxides are added to the melt in temperature-dependent oxidation stages. Common refining agents include Sb(V) oxide, As(V) oxide and Sn(IV)-oxide. An increased mixing of the melt and thus an improved homogenization is obtained by oxygen released in situ by the refining agents or by additional mechanical gas introduction. Moreover the additional release of oxygen causes growth of small gas bubbles present already in the glass melt.

Small bubbles are pumped up with the refining gas $O_2$ arising from the refining agent during chemical refinement. The resulting larger bubbles formed more rapidly rise in the glass melt. The refinement thus leads to removal of the glass inclusions, which leads to a higher quality product.

The chemical refinement also comprises a sequence of elementary steps interlaced with each other spatially and temporally. First the finely dispersed bubbles in the raw melt are greatly inflated by the refining oxygen gas so that a drastic shortening of the bubble rise time occurs. At the same time the refining bubbles extract gas dissolved in the glass. As much as possible, resorption of the unavoidably present residual bubbles occurs in the subsequent cooling steps. Color, moisture content and the so-called reboil conditions for $O_2$ and $SO_2$ are the targeted parameters for a successful adjustment of the gas content of the glass. Once a satisfactory bubble quality is obtained it is not impaired in subsequent cool-down or casting processes.

Chemical refinement has several principal disadvantages. First the methods. First these methods do not function well for every glass system, especially during NaCl refinement, or only at higher temperature, which also requires much time, since gas diffusion in the melt takes too long. Thus the refining chambers must be comparatively large, which further increases product costs. Finally the chemical refining agents change the chemistry of the glass and thus its properties. Moreover arsenic oxide is extremely poisonous and the required purity is not reached without more work. Major environmental problems are also connected both with its manufacture and its use. They also occur for antimony oxide. Cerium oxide itself is of course not poisonous, but it is extremely expensive so that its use is limited to specialty glass.

So-called physical refining methods, which do not impair or damage the chemistry of the glass, are also known because of these disadvantages for chemical methods. The physical refinement of a glass melt is based on the "forcing" of the bubbles to the surface of the melt, where they are destroyed and their gas content released or on their dissolution in the melt.

DE-A 3 022 091 described an apparatus for melting glass in a melt oven with a refining device for refinement of the glass and at least one receiver in which a direct current is applied to a heated electrode formerly or usually operated with alternating current.

A method and apparatus for melting of those glasses which have a high reducing action in a melted state are described in DE-A 3 906 270. Especially in phosphate glass, whose reducing action is even more pronounced in the melted state, erosion by immersion of platinum parts should be avoided. The reducing action of phosphate glass is so great that the glass reacts with platinum or a platinum alloy of the melt-containing vessel to form a platinum-phosphorous alloy. This platinum-phosphorous alloy however has a melting point of 588° C., which is below the glass melt temperature. This alloy is dissolved in the melt, which leads to the dissolving of the platinum glass melt-containing vessel. This is also the situation for platinum stirring tools or elements. According to this publication this is avoided by supplying the environment of the glass melt container, i.e. its outer surface, with oxygen. The interior surface, witch is in contact with the glass melt, is protected by an oxygen rich glass layer formed by the oxygen. Thus the use of platinum containers is possible, which avoids the use of ceramic melt-containing vessels, which impair the optical quality of the glass. In this process however conditions must be selected in which the oxygen permeability of the platinum container is guaranteed, which is achieved by raising the temperature.

U.S. Pat. No. 5,785,726 describes a method of making glasses for flat display screens, especially LCDs (Liquid Crystal Displays) and TFTs (Thin Film Transistors). In this method the production of oxygen bubbles arising in the cool-down region, the so-called "$O_2$-reboil", is avoided by rinsing the platinum parts of the cool-down region at least partially with hydrogen. The oxygen present in the glass melt is reduced to water by the hydrogen-permeable platinum vessel in this way, whereby oxygen gas bubbles are dissolved.

SUMMARY OF THE INVENTION

It is an object of the present invention to provide an improved method for refining and homogenizing a glass melt in which the use of arsenic oxide, antimony oxide and cerium oxide can be avoided.

It is also an object of the present invention to provide an apparatus for performing the improved method.

These objects are attained by the method and apparatus described in the appended claims.

Surprisingly it has been found that, although noble metals are not oxygen permeable, conducting oxygen through a device having a noble metal sleeve or casing, such as a noble metal pipe, which is immersed or dipped in a liquid containing water and/or hydroxyl groups, for example a glass melt, vigorously generates oxygen bubbles in the liquid. This gas generation is so great, that the liquid, which is the glass melt, is very thoroughly mixed by the vigorous bubble generation. Because of this gas generation the schlieren present is dissipated and the small bubbles present are inflated, so that they rise faster. The conduction of oxygen through a platinum pipe immersed or dipped in a glass melt thus leads to very great oxygen bubble development in the melt and thus to a removal of gas inclusions in the melt.

It is possible in this way to avoid the use of very expensive and/or poisonous chemical refining agents. Thus in a preferred embodiment of the method of refining end homogenizing a glass melt no chemical refining agents are introduced into the glass melt. Glass of higher purity may thus be prepared according to the methods of the invention, which is free of gas inclusion and free of additional impurities introduced by the refinement.

The method according to the invention is also suitable for removal of water residues and/or hydroxyl residues.

Furthermore this method is very well controlled by adjusting the oxygen content and/or partial pressure of oxygen in the gas flow. The method is appropriately not limited to a definite temperature as is required in many chemical and other physical refining processes.

The noble metals, which are suitable for use in this method, are principally all those noble metals, which are particularly hydrogen permeable at the conditions occurring in the glass melt, i.e. those which have a high hydrogen diffusion coefficient. Platinum and all metals belonging to the platinum group metals, gold, rhenium or osmium, or alloys thereof, are suitable. According to the invention other materials may be used for the noble metal member, which are stable at the process temperatures and which have a bridge or portion of the foregoing of noble metals. The bridge or portion of the noble metals must extend between the outside surface or outer side facing the glass melt and the inner surface or interior side of the noble metal member. This type of bridge can be a network or a number of fibers. A platinum vessel and/or platinum dish can be used as the noble metal member. It is most important that the oxygen acts only on those regions of the melt-containing vessel in which the refining occurs. In a preferred embodiment of the method of the invention, a noble metal pipe is arranged, especially in the region in which the refining step occurs. Preferably the pipe runs to the vessel bottom. This sort of pipe appropriately has a meandering shape, which preferably passes through the entire refining region. In some cases it has proven to be sufficient when the oxygen-rinsed noble metal pipe is installed at a single place in the refining region. In its simplest form the oxygen-rinsed noble metal pipe is a U-shaped pipe, which is arranged in the melt so that it is either dipped in the melt from above or is guided through the melt from below. In both cases the horizontal portion of the U-shaped pipe extends along the vessel bottom or is spaced a short distance from it.

In an additional preferred embodiment the noble metal member includes a stirrer rinsable with oxygen gas. In this way the advantageous features may be combined with each other, which produce mechanical stirring of the melt and thorough mixing. This leads to a particularly efficient homogenizing and refining.

Air and oxygen-containing waste air from process gas, such as exhaust gas from combustion, especially from gas and oil burners. However it is also possible to use pure oxygen in the method according to the invention.

In another preferred embodiment of the process the oxygen input is controlled by means of a control element. This preferably happens so that the oxygen partial pressure of the melt is determined by means of a probe, such as the probe described by Frey, Schaeffer and Baucke in Glasstechn. Ber. [Glass Engineering Report] 53, pp. 116–123 (1980). The oxygen input to the noble metal member can be exactly controlled by means of a control device responding to the measured values from the probe. Since other gases, such as $CO_2$ or also $SO_2$, are also removed by the oxygen refining, the oxygen input can also be controlled by a suitable $SO_2$- or $CO_2$-probe.

In an additional embodiment according to the invention the oxygen introduced into the glass melt by the refining process according to the invention is removed in a process step occurring after the refining. This can occurs for example by working at low pressure besides the known physical methods. The dissolved oxygen and/or the minute, frequently invisible gas bubbles still present expand under a low pressure, so that they rapidly rise to the surface of the melt. In another possible embodiment the melt is acted on by pressure in this process step so that a so-called "forcing off" of the bubble formation occurs.

It is especially preferred however in a particularly advantageous embodiment of the method to arrange an additional hydrogen permeable noble metal member in the melt and to act on it with hydrogen, hydrogen-containing gas or gases and/or vapors, which split off hydrogen at higher temperatures, such as water and/or ammonia. In this way oxygen residues still present in the melt are reduced to water and/or to hydroxyl groups, which are dissolved in the glass melt and in the finished glass. These latter products have no noteworthy influence on the glass quality of the finished glass. Preferably a control device or member controls the hydrogen feed in this step. The control device or member itself receives its control signals from an oxygen probe dipped in this region of the glass melt, which in a preferred embodiment of the method is the cool-down region following the refining region. The oxygen probe measures the concentration of oxygen residues.

The oxygen is preferably removed in the cool-down region. This means that the appropriate additional noble metal member is arranged in this region. The additional noble metal member can be formed, as a whole, like the noble metal member described above for generating oxygen in the melt. The so-called feeder trough is an additional preferred location for removal of oxygen from the glass melt.

The invention also includes an apparatus for performing the foregoing method. The apparatus according to the invention includes a region, in which the liquid, especially the glass melt, is in contact with a noble metal member. The noble metal member has one side facing the liquid and/or glass melt and another side acted on with the oxygen that is facing away from the liquid and/or glass melt. In a special embodiment of the apparatus this noble metal member is the vessel base or bottom, in which the glass melt is refined. In another preferred embodiment of the apparatus of the invention the noble metal member is a mechanical stirrer, whose interior side can be rinsed with the oxygen gas.

The glasses obtained by the method according to the invention are especially suitable for making electronic tubes, such as display screens, especially televisions and computer monitors, as well as flat screen devices, such as LCDs and TFTs. Also the glasses obtained by the method according to the invention are especially suitable for optical lenses and units and devices containing them. Lamp glass and glass for light sources are also suitable applications. The glasses obtained by the method according to the invention are also suitable for making cooking panels for hearth, such as Ceran® panel, and for cooking-ware (Jenaerglass®) and for microwave cooking units.

BRIEF DESCRIPTION OF THE DRAWING

The objects, features and advantages of the invention will now be illustrated in more detail with the aid of the following description of the preferred embodiments, with reference to the accompanying figures.

DESCRIPTION OF THE PREFERRED EMBODIMENTS

Figure 1:
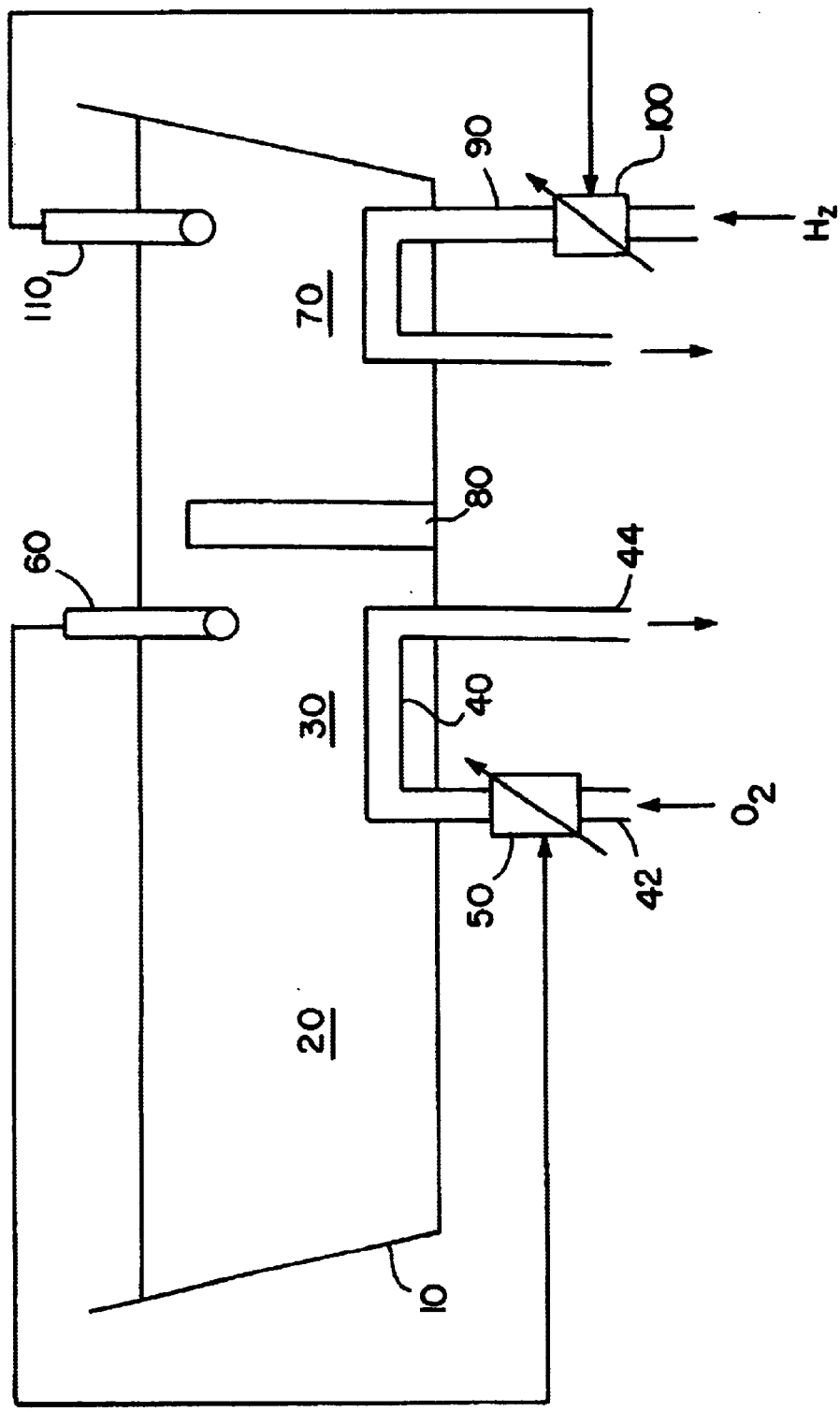
FIG. 1 is a diagrammatic cross-sectional view through an apparatus for performing a first embodiment of a method for refining a glass melt according to the present invention.

An apparatus for making glass according to a preferred embodiment of the invention is shown in FIG. 1. A glass melt vessel 10, in which the minerals used to make glass, such as quartz, soda, lime, marble, etc, are supplied in a finely divided or ground heap is shown in FIG. 1. Subsequently these solids are melted in a melting region 20 to form a glass melt and the glass melt then flows further into the refining region 30 of the melt vessel 10, A noble metal pipe 40, which includes an oxygen inlet section 42 and an oxygen outlet section 44, is arranged in the glass melt in the refining region 30 at the bottom of the vessel 10. The oxygen inlet section 42 is controlled by means of a first control device 50, which receives control signals from a first oxygen probe 60 immersed or dipped in the refining region 30. The melt region 20 and the refining region 30 of the glass melt vessel 10 are separated from a cool-down region 70 by a separating wall 80, which doss not reach to the upper surface of the glass melt. In the cool-down region 70 another noble metal pipe 90, which is formed in a similar manner to the oxygen supplying noble metal pipe 40, is arranged near the bottom of the melt vessel 10. This other noble metal pipe 90 is washed or rinsed with hydrogen, water vapor or mixtures of them with other gases. The hydrogen supply in the pipe 90 is controlled by means of a second control device 100, which receives its control signals from a second oxygen probe 110, which is arranged in the glass melt in the cool-down region 70 or after it to detect oxygen residues in the glass melt.

Figure 2:
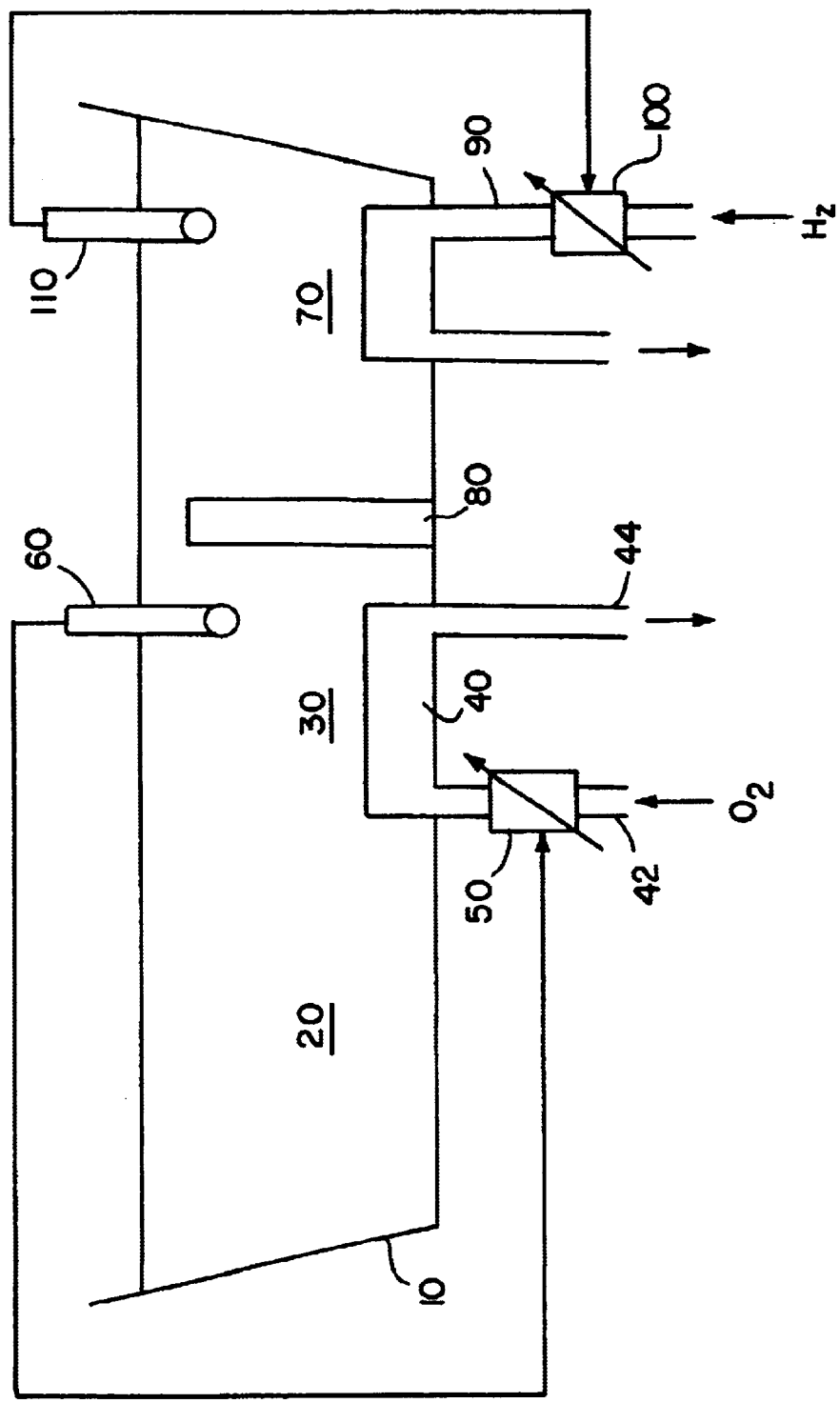
FIG. 2 is a diagrammatic cross-sectional view through an apparatus for performing a second embodiment of a method for refining a glass melt according to the present invention.

FIG. 2 shows a different apparatus, similar to apparatus shown in FIG. 1, for performing another preferred embodiment of the method of the invention. Components of the apparatus of FIG. 2, which perform the same functions or are the same as corresponding components of FIG. 1, are given the same reference numbers as in FIG. 1. The embodiment illustrated in FIG. 2 differs from the embodiment shown in FIG. 1, because the pipes 40 and 90 supplied with oxygen and hydrogen respectively are part of the bottom of the melt vessel 10, which is made of platinum in this embodiment. That means that the pipes 40 and 90 have a sidewall that forms part of the bottom of the melt vessel 10.

Figure 3:
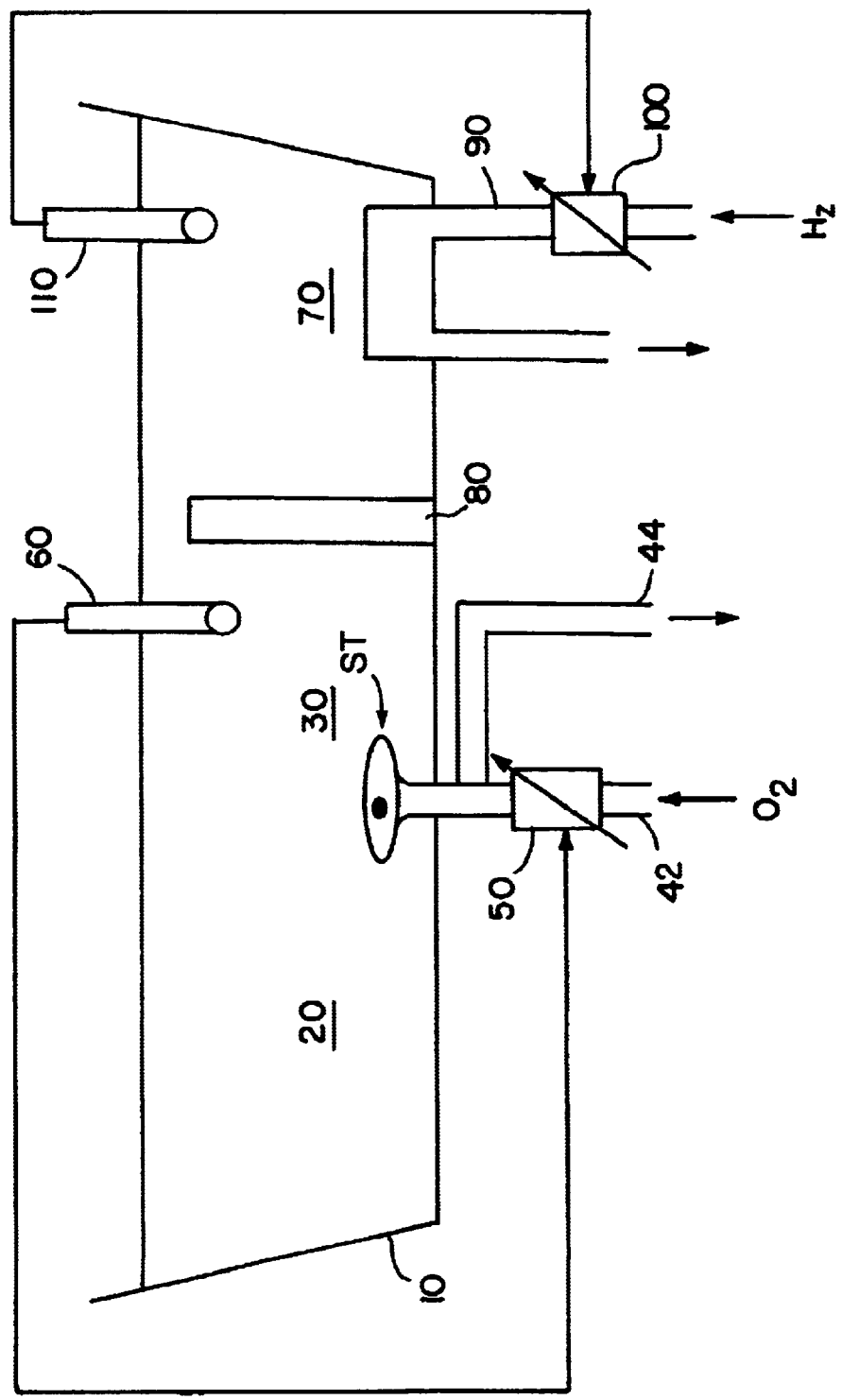
FIG. 3 is a diagrammatic cross-sectional view through an apparatus for performing a third embodiment of a method for refining a glass melt according to the present invention.

FIG. 3 shows a third different apparatus, similar to the apparatuses shown in FIGS. 1 and 2, for performing an additional preferred embodiment of the invention method. Components of the apparatus of FIG. 3, which perform the same functions or are the same as corresponding components of FIGS. 1 and 2, are given the same reference numbers as in FIGS. 1 and 2. Here the principal differences is the use of a mechanical stirrer ST in the glass melt in the refining region 30 as the at least one noble metal member. The interior of the mechanical stirrer ST is rinsed with oxygen, which enters through inlet section 40 and leaves through outlet section 44, as in the embodiments shown in FIGS. 1 and 2. As in the previous embodiments the supply of oxygen is controlled with a first control device 50 according to control signals from first oxygen probe 80.

The disclosure in German Patent Application 100 09 425.2 of Feb. 28, 2000 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method and apparatus for oxygen refining of a glass melt and glasses manufactured by a process using this method and/or apparatus, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of making glass, said method of making glass comprising refining a glass melt in a glass-melt containing vessel with oxygen, said refining comprising the steps of:
   a) arranging at least one noble metal member in the glass melt, said at least one noble metal member having an inner surface facing away from the glass melt and an outer surface facing toward the glass melt; and
   b) bringing oxygen or an oxygen-containing gas mixture with an oxygen partial pressure sufficient for said refining into contact with the inner surface of the at least one noble metal member facing away from the glass melt so as to act on the inner surface with said oxygen or said oxygen-containing gas mixture and to refine the glass melt.

2. The method as defined in claim 1, wherein said at least one noble metal member is at least a portion of said glass-melt containing vessel.

3. The method as defined in claim 1, wherein said at least one noble metal member includes a noble metal pipe arranged in the glass melt and directly over a bottom portion of said glass-melt containing vessel.

4. The method as defined in claim 1, wherein said at least one noble metal member consists of a mechanical stirring device, whose interior surfaces are rinsable with said oxygen or said oxygen-containing gas mixture.

5. The method as defined in claim 1, wherein said at least one noble metal member consists of a metal selected from the group consisting of platinum group metals, gold, alloys of gold and alloys of the platinum group metals.

6. The method as defined in claim 5, wherein said platinum group metals include platinum, rhenium and osmium.

7. The method as defined in claim 1, performed without introducing chemical refining agents to said glass melt.

8. The method as defined in claim 1, further comprising arranging another noble metal member in said glass melt in a cool-down region of said glass-melt containing vessel and washing said another noble metal member with hydrogen, in order to remove oxygen residues formed in the glass melt in said cool-down region by the bringing of said at least one noble metal member into contact with said oxygen or said oxygen-containing gas mixture.

9. The method as defined in claim 8, further comprising measuring a concentration of said oxygen residues in the glass melt in said cool-down region by means of an oxygen probe and controlling hydrogen supply to said another noble metal member by means of control signals generated by said oxygen probe.

10. The method as defined in claim 1, wherein said inner surface of said noble metal member does not contact said glass melt but at least a portion of said outer surface of said noble metal member contacts said glass melt.

11. The method as defined in claim 1, wherein said at least one noble metal member is a noble metal pipe arranged in the glass melt in the glass-melt containing vessel, and having another noble metal member having a noble metal pipe arranged in member is a noble metal pipe arranged in the glass melt in the glass-melt containing vessel, and having another noble metal member having a noble metal pipe arranged in a cool-down region of the glass-melt containing vessel; and further comprising controlling said oxygen partial pressure in said at least one noble metal member with control signals from a first oxygen probe immersed in said glass melt and controlling a hydrogen supply to said another noble metal pipe with control signals from a second oxygen probe immersed in said glass melt, so as to refine said glass melt but remove oxygen residues from said glass melt.

* * * * *